(No Model.)

J. N. MILLER.
CARRIAGE.

No. 353,322. Patented Nov. 30, 1886.

Witnesses:
E. K. Campbell
Ned Campbell

Inventor:
Jacob N. Miller
per C. A. Campbell
atty.

UNITED STATES PATENT OFFICE.

JACOB N. MILLER, OF BELLEFONTAINE, OHIO.

CARRIAGE.

SPECIFICATION forming part of Letters Patent No. 353,322, dated November 30, 1886.

Application filed February 26, 1886. Serial No. 193,514. (No model.)

*To all whom it may concern:*

Be it known that I, JACOB N. MILLER, a citizen of the United States, and a resident of Bellefontaine, in the county of Logan and State of Ohio, have invented a new and useful Improvement in Carriages, of which the following is a specification.

My invention is an improvement on vehicle-bodies, and on my former Patent No. 141,065, and is fully described in the following specification, reference being had to the accompanying drawings.

The improvement consists, essentially, in adjusting the large shifting seat in a shifting-seated surry, (having stick-work railing,) so that when the rear seat is advanced to its front position a rail or molding along the side of the seat will form, with the rail of the stick-work on the body, a continuous rail, and when the large seat is retracted or thrown to its rear position the space in front of the rail and stick-work on the body forms an entrance for admission to the rear seat without opening the usual side door; in making the bottom and top of my standards or canopy-posts cone-shaped, and fitting in funnel-shaped bearings, so that all wear can be taken up by the nut and screw thereon, thus preventing rattling; in sinking a nut in the rim of the roof in such manner that the standards can be attached or detached without removing or interfering with the top covering of the buggy, and in forming the bent rim of the roof with a rabbet and hooks, so that the curtains may be readily hung and the upper edge of the curtain be invisibly secured.

Figure 1:
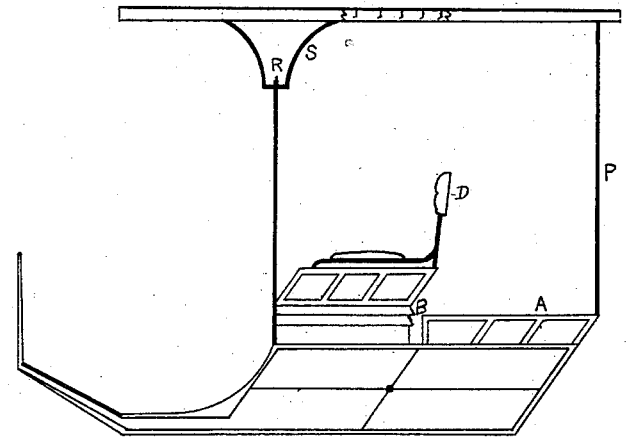
Figure 2:
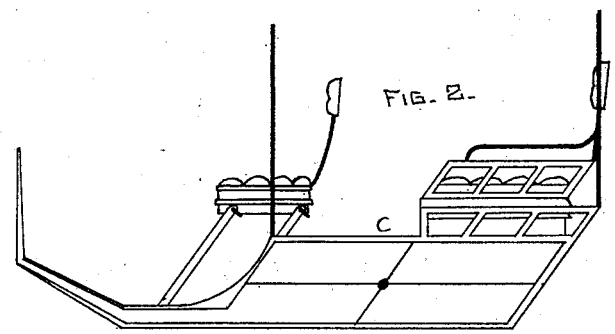
Figure 3:
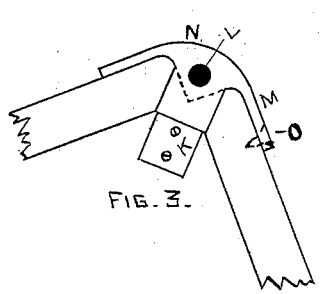
Figure 4:
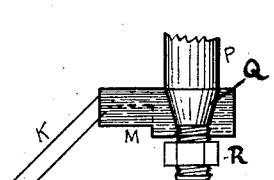
Figure 5:
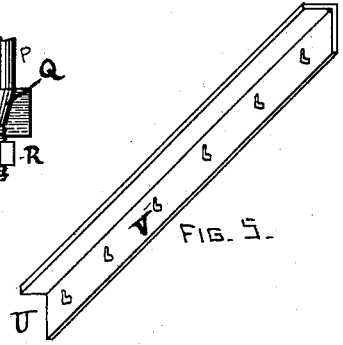
Figure 6:
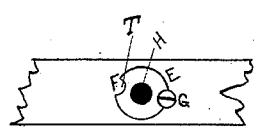

Figure 1 is a side view of my vehicle, showing it used as a one-seated rig, Fig. 2 as a two-seated vehicle; Fig. 3, a view of my bracket for supporting the canopy-posts and strengthening the joint where the corner-posts of the body and the side and back rails meet; Fig. 4, a view of my cone-shaped standard; Fig. 5, cornice or rim of the roof; Fig. 6, countersunk nut, in which standards are attached in the lower side of the rim.

A is the stick-railing on the rear of the body; B, rail on the seat, forming part of continuous rail, thrown forward a little in the drawing to show the two parts separated a little; C, entrance to rear seat when the vehicle is used as a two-seated rig; E, sunken nut in the rim of the top; F, notch in side of the nut for reception of screw to hold same in position; G, screw; H, hole in nut, in which the end of post P screws; D, lazy-back on front seat; N, corner bracket, of malleable iron, having funnel-shaped hole L through it, to receive the cone-shaped end Q of the standards, and also having the arms K M with screw-holes O, through which the bracket is fastened to the corner-post and side rails of the body; P, standards or canopy-posts, having cone-shaped parts Q, that fit in the funnel-shaped holes L; R, nut that fastens the posts P in the brackets; U, rabbet in the bent-wood rim of the canopy; V, hooks secreted in the rabbet of the canopy-rim to secure the curtains to.

In place of the stick-work A, I may use panel-work, making the side of the seat to correspond, so that when used as a single seat the side will be a uniform continuous piece.

What I claim is—

1. The combination, with the stationary rail A on the body of the buggy, of the rail B on the shifting seat that forms a continuous rail when the vehicle is used as a one-seated vehicle.

2. The combination, with the rail A on the body of the buggy and cut-away part C, of the shifting seat carrying the rail B, which forms a continuous rail from the rear of the vehicle to the front of the seat when used as a one-seated vehicle, and forms an entrance when used as a two-seated vehicle, as and for the purpose set forth.

3. In a standing-top buggy, the combination, with the bracket N and the cones Q on the ends of the standard P, of funnel-shaped holes L, and nut R, as and for the purpose set forth.

4. The combination, with the screw on the top of the canopy-posts P, of the nut E, sunken in the bottom of the rim of the canopy-top and held in position by two ordinary screws sunk in the holes T, as and for the purpose set forth.

JACOB N. MILLER.

Attest:
E. K. CAMPBELL,
ED. CAMPBELL,